(12) United States Patent
Braun et al.

(10) Patent No.: US 12,539,615 B2
(45) Date of Patent: Feb. 3, 2026

(54) EQUIPPING ARRANGEMENT AND METHOD FOR EQUIPPING CONNECTOR HOUSINGS

(71) Applicant: Komax Holding AG, Dierikon (CH)

(72) Inventors: Alfred Braun, Dierikon (CH); Pascal Suter, Hünenberg (CH)

(73) Assignee: INVENTIO AG, Hergiswil (CH)

( * ) Notice: Subject to any disclaimer, the term of this patent is extended or adjusted under 35 U.S.C. 154(b) by 981 days.

(21) Appl. No.: 17/653,135

(22) Filed: Mar. 2, 2022

(65) Prior Publication Data

US 2022/0297302 A1    Sep. 22, 2022

(30) Foreign Application Priority Data

Mar. 16, 2021    (EP) .................................... 21162722

(51) Int. Cl.
*B25J 9/16* (2006.01)
*B25J 15/00* (2006.01)
*H01R 43/048* (2006.01)

(52) U.S. Cl.
CPC ........... *B25J 9/1692* (2013.01); *B25J 9/1612* (2013.01); *B25J 9/1653* (2013.01); *B25J 9/1669* (2013.01); *B25J 9/1697* (2013.01); *B25J 15/0028* (2013.01); *H01R 43/048* (2013.01)

(58) Field of Classification Search
CPC ........................... H01R 43/205; B25J 15/0028
See application file for complete search history.

(56) References Cited

U.S. PATENT DOCUMENTS

2018/0183200 A1 *  6/2018  Kobayashi ............. H01R 43/26

FOREIGN PATENT DOCUMENTS

| EP | 1304773 A1 | 4/2003 | |
|---|---|---|---|
| EP | 2317613 A1 * | 5/2011 | ............ H01R 43/20 |
| EP | 2783814 A2 | 10/2014 | |
| EP | 3301768 A1 | 4/2018 | |
| EP | 3301769 A1 | 4/2018 | |
| GB | 2357530 A | 6/2001 | |
| JP | 2011096659 A | 5/2011 | |
| JP | 2018103334 A | 7/2018 | |
| WO | 2017182325 A1 | 10/2017 | |

* cited by examiner

*Primary Examiner* — Daniel Jeremy Leeds
(74) *Attorney, Agent, or Firm* — Shumaker, Loop & Kendrick, LLP

(57) ABSTRACT

An equipping arrangement for equipping connector housings with fitted-out cable ends of cables has an equipping gripping unit that provides subsequent gripping, when necessary, during inserting the fitted-out cable end into the connector housing. A cable gripper has two gripper jaws grasping and gripping the cable when actuated by an actuator operated with fluid pressure. An alignment module rotationally corrects alignment of the fitted-out cable end using an optical detection device determining the rotational position of the fitted-out cable end. The detection device monitors an opening motion of the gripper jaws to create an intermediate position. A control unit controls the actuator and calibrates the actuator with regard to the subsequent gripping based on data of the opening motion of the gripper jaws determined by the detection device.

15 Claims, 8 Drawing Sheets

EQUIPPING ARRANGEMENT AND METHOD FOR EQUIPPING CONNECTOR HOUSINGS

FIELD

The invention relates to an equipping arrangement for equipping connector housings with fitted-out cable ends of cables. Furthermore, the invention relates to a method for equipping connector housings with fitted-out cable ends of cables. The equipping is carried out by means of an equipping gripping unit, the cable gripper of which guides the cable to the connector housing, and which inserts the cable end into a cell of the connector housing to be fitted. Such equipping arrangements are often downstream of preparation systems. A preparation system may comprise a stripping station for cutting and stripping the cable, one or more crimping stations for applying crimp contacts to the stripped cable ends, and, where necessary, grommet stations. However, the equipping arrangement could also be a component of a preparation system.

BACKGROUND

Equipping machines are known in cable processing and are used to fit connector housings with the desired cables for the production of partial cable harnesses. Contact parts (e.g. crimp contacts) are usually already attached to the cable ends, which contact parts snap into the connector housing and allow the electrical connection. When equipping, i.e. inserting, the fitted-out cable end into the connector housing, a cable gripper guides the end of the cable into the correct plug-in position. In many cases, after the first partial insertion of the cable end, the cable must be regrasped at a rearward position in order to fully insert the cable tip. Particularly thin cables have to be inserted with the intermediate step of subsequent gripping because they are much more pliable compared to thicker cables. As the weight of cable harnesses continues to decrease, the number of thinner cables has increased significantly compared to thicker ones. An equipping arrangement adapted for subsequent gripping has become known, for example, from EP 2 317 613 A1. This equipping arrangement comprises a cable gripper, wherein the gripper jaws can be moved pneumatically on the one hand and in a motor-driven manner on the other. The pneumatic cylinder of the pneumatic actuator is used to close the gripper jaws in order to apply the force required for the closing motion. The force must be large enough to be able to perform a pullout test after insertion. With the help of the pullout test, it can be determined whether the cable end has been correctly inserted into the connector housing or, more precisely, into a corresponding cell of the connector housing. The cable gripper also has an electromechanical drive so that the gripper jaws only open as far as necessary to create the required intermediate position during subsequent gripping. To a certain extent, this hybrid gripper uses the power of pneumatics and the accuracy of electromechanics. This arrangement is complex and expensive because of the double system of actuators. Furthermore, this arrangement requires a comparatively large amount of space.

SUMMARY

It is therefore an object of the present invention to avoid the disadvantages of the known equipping arrangement and in particular to create an improved equipping arrangement for equipping connector housings with fitted-out cable ends of cables, which allows a subsequent gripping of cables when inserting the cable end into the connector housing.

According to the invention, this object is achieved by an equipping arrangement for equipping connector housings with fitted-out cable ends of cables comprising a cable gripper with two gripper jaws for grasping and gripping the cable and an actuator which can be operated with pressure means for actuating the cable gripper.

The equipping arrangement also comprises a gripper location system that preferably works without contact and is preferably arranged outside the cable gripper in the equipping arrangement. The gripper location system is set up to determine the position of the gripper jaws, in particular during an opening motion into an intermediate position that is carried out as a test. The gripper location system is operatively connected to the cable gripper such that the cable gripper can be calibrated for the intermediate position by means of the gripper location system. The cable gripper calibrated in this way ensures safe and precise handling of the cable by the cable gripper during the production phase, in which the equipping of the connector housings takes place with the fitted-out cable ends during subsequent gripping. The arrangement is characterized by a simple structure and does not require a high outlay in terms of control technology.

According to a preferred embodiment, the equipping arrangement can comprise an alignment module for the rotationally correct alignment of the fitted-out cable end with an optical detection device for determining the rotational position of the fitted-out cable end.

The cable gripper and the actuator, which can be operated with pressure means, are designed such that, in a closed position of the gripper jaws, the cable can be held in a clamping manner by the gripper jaws for inserting the fitted-out cable end into the connector housing. In order to allow subsequent gripping, the gripper jaws can be transferred from the closed position to an intermediate position by means of an opening motion. When the gripper jaws have reached the intermediate position, the cable gripper opened in this way can be moved back along the cable for subsequent gripping. Due to the fact that the optical detection device is preferably designed such that an opening motion of the gripper jaws can also be monitored with this detection device, it is possible to ensure subsequent gripping of the cable in a simple and efficient manner when inserting the cable end into the connector housing. The equipping arrangement can comprise a control unit for controlling the actuator, the control unit being connected to the alignment module such that the cable gripper actuator, which can be operated with pressure media, can be calibrated for the intermediate position using data of the opening motion of the gripper jaws determined by the optical detection device. The equipping arrangement is characterized by a less complicated structure and few components overall. Accordingly, a compact design is also available. In particular, an equipping gripping unit containing the cable gripper can be built comparatively slim. The gripper location system mentioned at the outset does not necessarily have to be formed by the detection device of the alignment module described here. A gripper location system having an optical detection device for determining the position of the gripper jaws of the cable gripper can be used for specific applications, for example for handling contact elements with a round outer contour in cross section, which do not have to be aligned for equipping. This detection device can be of the same type or at least similar to the detection device of the alignment module described in detail below; only the rotational position of the fitted-out cable end is not or no longer determined with this detection device.

The cable gripper preferably has two gripper jaws, which can be moved in opposite directions, for grasping and gripping the cable. In the closed position of the gripper jaws, the cable can be held in a clamping manner. In this case, the holding takes place in a region of the cable end, which region as a rule adjoins directly or close to the region of the cable associated with the contact element. The cable gripper that can be operated with pressure means can preferably be a pneumatic actuator for actuating or activating the cable gripper for the motion of the gripper jaws. By actuating the pressure means, the gripper jaws can be moved toward one another to close or away from one another in order to open the cable gripper. The motion toward one another is referred to below as the closing motion; the closed position corresponds to an end position in which the gripper jaws hold the cable in a clamping manner. When the gripper jaws are moved apart, the opening motion takes place; the open position corresponds to a position in which the gripper jaws are far enough spaced apart from the cable such that the cable gripper can be removed from the cable and a new cable can be grasped. Pressure means are means which, by means of a fluid (e.g. a gas or a liquid), exert pressure on an actuating element (e.g. a piston of a pneumatic cylinder) of the actuator which can be operated with pressure means. Pneumatic means, i.e. in particular compressed air, are preferably used as pressure means. Hydraulic means are also conceivable.

When equipping connector housings, there are also contact parts that can only be inserted into the connector housing in a specific alignment. The purpose of the alignment module is to align the fitted-out cable end that is equipped with such a contact part. For example, such a special contact part can have an outer contour that is rectangular in cross section. For this purpose, the alignment module for the rotationally correct alignment of the fitted-out cable end can comprise a rotating device for rotating the cable about its longitudinal axis. In the case of the optical detection device already mentioned, the rotational position of the fitted-out cable end can be checked after the alignment of the cable end was carried out by means of the rotating device. The detection device can have optical means such as a camera or other optical projection sensors, for example, as well as an image evaluation device and optionally an illumination device. Alignment modules for the rotationally correct alignment of fitted-out cable ends with rotating devices for rotating the cable about its longitudinal axis and with optical detection devices are shown, for example, in EP 1 304 773 A1 or EP 3 301 768 A1. However, the alignment module can also be used for fitted-out cable ends with contact elements with more or less rotationally symmetrical outer contours or even for merely stripped cable ends for the calibration described here with regard to the subsequent gripping process. In the case of cable ends of this type, the rotation device of the alignment module does not have to be used. In such a case, the rotary device of the alignment module could also be removed from the alignment module.

The detection device is designed such that the opening motion for creating an intermediate position for subsequent gripping, when equipping the connector housing of the gripper jaws, can be monitored with the detection device. In the case of this monitoring, the motion and/or position data of the open gripper jaws can be determined in a position that corresponds to the intermediate position in the production phase. In the present case, the intermediate position is understood to mean the position of the gripper jaws in which the gripper jaws no longer hold the cable in a clamping manner, but rather hold it loosely. In the intermediate position, the cable is at least partially surrounded radially by the gripper jaws, so that a guiding function can be maintained. For subsequent gripping, the gripper jaws opened in this way or the gripper jaws in the intermediate position can be moved back along the longitudinal axis of the cable (i.e. in the opposite direction relative to the introduction or insertion direction for inserting the cable end into a cell of the connector housing). The corresponding subsequent gripping is a prerequisite for the cable to be able to be gradually advanced for the complete insertion of the cable end into the connector housing, which can be necessary in particular in the case of thin cables.

To control the motion of the gripper jaws, the equipping arrangement has, as previously mentioned, a control unit for controlling the actuator for moving the gripper jaws. The control unit is designed and electronically connected to the alignment module such that, based on the data of the previously performed opening motion of the gripper jaws, which data were determined by the detection device, the actuator can be calibrated with regard to the subsequent gripping process from the closed position to the intermediate position when inserting the fitted-out cable end into the connector housing. By virtue of the calibration, the required precision and repeatability for subsequent gripping when equipping connector housings with fitted-out cable ends can be achieved with actuators of cable grippers operated by pressure media. An actuator having a comparatively simple structure can be used. A large number of additional sensors are not required.

The equipping arrangement can further comprise a transfer device with which the cable having the cable end between processing stations can be transferred. Of course, the cable can also be a piece of cable, both cable ends of which are equipped with crimp contacts. The alignment module already mentioned can be such a processing station. Another processing station can be an equipping module, in which the insertion of the cable end into the connector housing finally takes place. If necessary, the cable end can be brought to further processing stations, such as grommet stations, with the aid of the transfer device. The cable transfer can take place, for example, by shifting, pivoting, and/or by a longitudinal motion of the cable.

The equipping arrangement can have a movable carrier for the cable gripper, with which carrier the cable gripper can be moved, for example, from the alignment module to the housing receiving device of the equipping module that holds the connector housing. The pneumatic cylinder of the actuator can preferably be mounted on the carrier. The actuator can comprise a pneumatic cylinder, preferably configured as a double-acting one, with the actuator being mounted with the pneumatic cylinder on the carrier. This arrangement has the advantage that a particularly compact design can be obtained for the equipping gripping unit.

A pressure medium source, for example a compressed air source or compressed air supply line, can be provided to provide compressed air, for example. Furthermore, the equipping arrangement can have a valve arrangement for generating compressed air pulses from the compressed air. The control unit can be used to control the valve arrangement for generating compressed air pulses, for example of a predetermined duration.

In a preferred embodiment, the actuator has a valve arrangement having at least one control valve designed as a quick-acting valve (e.g. a magnetically actuable valve), with which at least one and optionally several compressed air pulses specified by the control unit can be applied to the actuator or, more precisely, its actuating element (e.g. a piston of a pneumatic cylinder) for the opening motion to create the intermediate position. A quick-acting valve can be a magnetically actuable valve. Such a quick-acting valve can be actuated by an electromagnet and can be switched very quickly. The multiple compressed air pulses can form a sequence of compressed air pulses, with the number and/or the length (or duration) of the compressed air pulses in the sequences being able to be varied, as a result of which an efficient calibration of the cable gripper with regard to subsequent gripping can be ensured. In order to determine the length and/or number of compressed air pulses for the desired opening of the cable gripper for an optimal intermediate position, the compressed air pulses are calibrated using the optical detection device of the alignment module.

According to a further embodiment, the actuator can comprise a pneumatic cylinder, preferably configured as a double-acting pneumatic cylinder, the actuator or more precisely the valve arrangement of the actuator having at least one control valve designed as a quick-acting valve (e.g. a magnetically actuable valve) for each pressure chamber of the pneumatic cylinder. An orifice valve can be connected upstream or downstream of at least one of the control valves and preferably the control valve associated with the pressure chamber which decreases during the opening motion. The orifice valve slows down the pressure reduction in the pressure chamber, which makes the reaction of the pneumatic cylinder sluggish and simplifies the control. In addition, the pneumatic system is less sensitive to external forces due to the higher chamber pressure. The orifice valve is substantially characterized by a short narrowing of the compressed air line. In the case of an orifice valve, the flow and the pressure drop are largely independent of the viscosity of the pressure medium.

The control unit can be designed such that both quick-acting valves of the pneumatic cylinder are switched together for a short period of time for a compressed air pulse. Compressed air or another pressure medium flows into a first chamber of the pneumatic cylinder. The compressed air escapes from the second chamber (the pressure chamber that is already mentioned above, which decreases during the opening motion) through the orifice valve. As soon as the quick-acting valves are closed, the gripper jaws are in a stable position because all pressure chambers are pressurized.

Instead of the orifice valve, a throttle check valve or an orifice check valve could be used. These valves would allow the cable gripper to close more quickly. However, the reproducibility of partial opening would be somewhat reduced with this structure. Closing the check valve requires a quantity of air that is difficult to determine.

The actuator or, more precisely, the valve arrangement of the actuator can have two control valves configured as quick-acting valves per pressure chamber, wherein an orifice valve can preferably be connected upstream or downstream of at least one of the control valves and preferably one of the control valves assigned to the pressure chamber which decreases during the opening motion.

The equipping arrangement can be configured such that, for the joint motion of the gripper jaws by means of a single pneumatic cylinder, both gripper jaws are geared to one another and to the piston of the pneumatic cylinder, so that the two gripper jaws can be moved simultaneously. However, it is also conceivable for each gripper jaw to be assigned a pneumatic cylinder. The simultaneous motion of the two gripper jaws can be ensured by appropriate control.

The detection device of the alignment module can have a camera and preferably a digital camera or an image acquisition module having at least two line sensors arranged in different directions both for determining the rotational position of the fitted-out cable end and for determining the motion and/or position data of the open gripper jaws in the intermediate position. The line sensors can be CCD or CMOS line sensors, for example. In addition to the camera or the image acquisition module, the detection device can comprise an image evaluation device for evaluating the image data generated by the camera or the image acquisition module and preferably an illumination device. The two different directions in which the line sensors are arranged or along which the line sensors extend can preferably run at right angles to one another. For example, one of the line sensors may be a horizontal line sensor and the other line sensor may be a vertical line sensor. The gripper location system mentioned at the outset can also have a digital camera or an image acquisition module having at least two line sensors arranged in different directions.

The camera can be positioned in a frontal position in relation to a longitudinal axis predetermined by the equipping gripping unit when the cable gripper is located in the effective range of the alignment module. The longitudinal axis specified by the cable gripper is therefore also referred to below as the "longitudinal axis of the gripper". This longitudinal axis preferably runs coaxially with the longitudinal axis of the cable when the cable is picked up by the cable gripper. Furthermore, the optical axis of the camera preferably lies approximately on the longitudinal axis of the gripper or on the longitudinal axis of the cable of the fitted-out cable end held by the cable gripper when the cable gripper is in the effective range of the alignment module. With regard to the setup process for setting up the cable gripper with regard to subsequent gripping, the camera looks to a specific extent in the axial direction at the frontal end of the cable gripper. During the alignment process, the camera looks to a specific extent in an axial direction at the frontal end of the cable. In the case of the image acquisition module, it is advantageous if the at least two line sensors of the image acquisition module lie on a plane that preferably runs perpendicularly to the longitudinal axis.

If the aforementioned camera is used for the detection device, it can be advantageous if markings are attached to the end faces of the gripper jaws, with the aid of which the image evaluation can be simplified.

The detection result for checking the corresponding intermediate position can be optimized if the gripper jaws each have jaw lugs. A jaw lug is understood to be a lug-like extension molded onto a jaw base body. In this case, the cable gripper has two opposing, preferably half-shell-shaped jaw lugs. The jaw lugs form extensions projecting away from the corresponding associated jaw base body in the axial direction, between which extensions the cable can be held in a clamping manner—as in the case of the jaw base bodies. To determine the motion and/or position data of the gripper jaws, which are open up to the intermediate position, the cable gripper can be introduced into the image acquisition module via the jaw lugs. If the jaw lugs are introduced into the image acquisition module, i.e. if the extensions are inserted into the image acquisition module or penetrate its recording region, the jaw lugs or at least the front ends or tips of the jaw lugs are next to or between the line sensors, so that the corresponding line sensor can record image data of the front ends of the jaw lugs and thus the gripper jaws.

A further aspect of the invention relates to a method for equipping connector housings with fitted-out cable ends of cables, with the equipping arrangement described above being used in particular for the method. The method for equipping connector housings with fitted-out cable ends of cables can comprise the following steps for or during the production phase: the cable end of the cable is clamped by means of a pneumatically drivable cable gripper, which gripper holds the cable in a clamping manner between two gripper jaws of the cable gripper in a closed position, to an alignment module comprising an optical detection device. In or with the alignment module, the rotationally correct alignment of the cable end is checked and, if necessary, aligned by means of a rotating device for rotating the cable about its longitudinal axis. To create the closed position, compressed air can be applied to an actuator of the cable gripper such that the cable is held in a clamping manner between two gripper jaws of the cable gripper in the closed position. After that, the cable end that has been checked and, if necessary, aligned in this way is inserted into a connector housing by the cable gripper, wherein, after the cable has been advanced for the first time, during or after which advancing the cable end has not yet been fully inserted into the connector housing, one or more subsequent gripping operations take place to gradually advance the cable further, with the gripper jaws being opened to an intermediate position for subsequent gripping.

The method according to the invention is characterized in that, at least before the production phase to set up the pneumatically drivable cable gripper with regard to subsequent gripping in the production phase, the following steps are carried out: feeding the cable gripper (preferably without cable) to the alignment module with the optical detection device, with which the rotationally correct alignment of the cable end can be checked, or to a gripper location system, and calibrating the cable gripper, by moving the gripper jaws of the cable gripper from the closed position in the open direction to create the intermediate position by means of at least one compressed air pulse as a test, wherein the motion and/or position data of the open gripper jaws are determined with the optical detection device of the alignment module or the gripper location system. The purpose of the calibration, with regard to subsequent gripping, is to determine optimal parameters for applying compressed air to the actuator when inserting the fitted-out cable end into a connector housing. By means of the at least one compressed air pulse, the gripper jaws are moved from the closed position into an open position, which corresponds to the intermediate position for the subsequent production phase. The motion and/or position data of the gripper jaws opened in this way are determined with the optical detection device of the alignment module and used for the calibration of the cable gripper. Alternatively, the motion and/or position data of the gripper jaws opened in this way can also be determined with the gripper location system mentioned above and used for the calibration of the cable gripper. The data determined in this way can be compared with the desired state for the intermediate position and, if the desired state has not been reached, the parameters of the at least one compressed air pulse are adjusted and the process is repeated. By using the alignment module for the calibration of the pneumatically drivable cable gripper with regard to subsequent gripping in the production phase, the arrangement for equipping connector housings with fitted-out cable ends can be set up and operated easily and efficiently.

In the production phase, the insertion of the cable end into the connector housing can therefore take place by the cable gripper as follows: after advancing the cable for the first time, during or after which advancing the cable end has not yet been fully inserted into the connector housing, one or more subsequent gripping operations are carried out to gradually advance the cable further, an intermediate position of the gripper jaws being set with at least one compressed air pulse obtained from the calibration for the subsequent gripping, which intermediate position is based on the manipulated variable determined during the calibration for the at least one compressed air pulse.

During the calibration, the gripper jaws can each be moved into the intermediate position with a compressed air pulse, with the length of the corresponding compressed air pulse being varied to create individual intermediate positions.

During the calibration, the gripper jaws can also be moved into intermediate positions by means of a sequence of compressed air pulses. The manipulated variable can thus also specify a sequence of compressed air blasts.

During the calibration, the gripper jaws can particularly preferably be moved into intermediate positions (one intermediate position per sequence) with several sequences of compressed air pulses, with the length (or duration) and/or the number of compressed air pulses being varied in the sequences.

If the optical detection device is or comprises a camera, it can be advantageous for the calibration of the cable gripper if the gripper jaws are brought into a focal range of the camera. Alternatively, it can be advantageous if the camera or lens setting of the camera is adjusted such that the camera focuses on the gripper jaws for the calibration. When aligning, the focus can be on the crimp contacts or other contact elements of the fitted-out cable ends.

When the optical detection device is or comprises an image acquisition module having at least two line sensors arranged in different directions, it is advantageous if the cable gripper is at least partially introduced into the image acquisition module during the calibration process, for example via its jaw lugs, so that at least one part (for example at least the front ends or tips of the jaw lugs) of the cable gripper is received in the observation region of the line sensors.

It is advantageous if the calibration is carried out at the start of production. In order to ensure reliable equipping over a long period of time, it can be advantageous if, after the initial calibration at the start of production, the calibration is repeated at predefined intervals.

DESCRIPTION OF THE DRAWINGS

Further individual features and advantages of the invention can be found in the following description of embodiments and in the drawings, in which:

FIG. 11 shows a pneumatic scheme for an alternative actuator for moving the cable gripper of the equipping arrangement.

DETAILED DESCRIPTION

Figure 1:
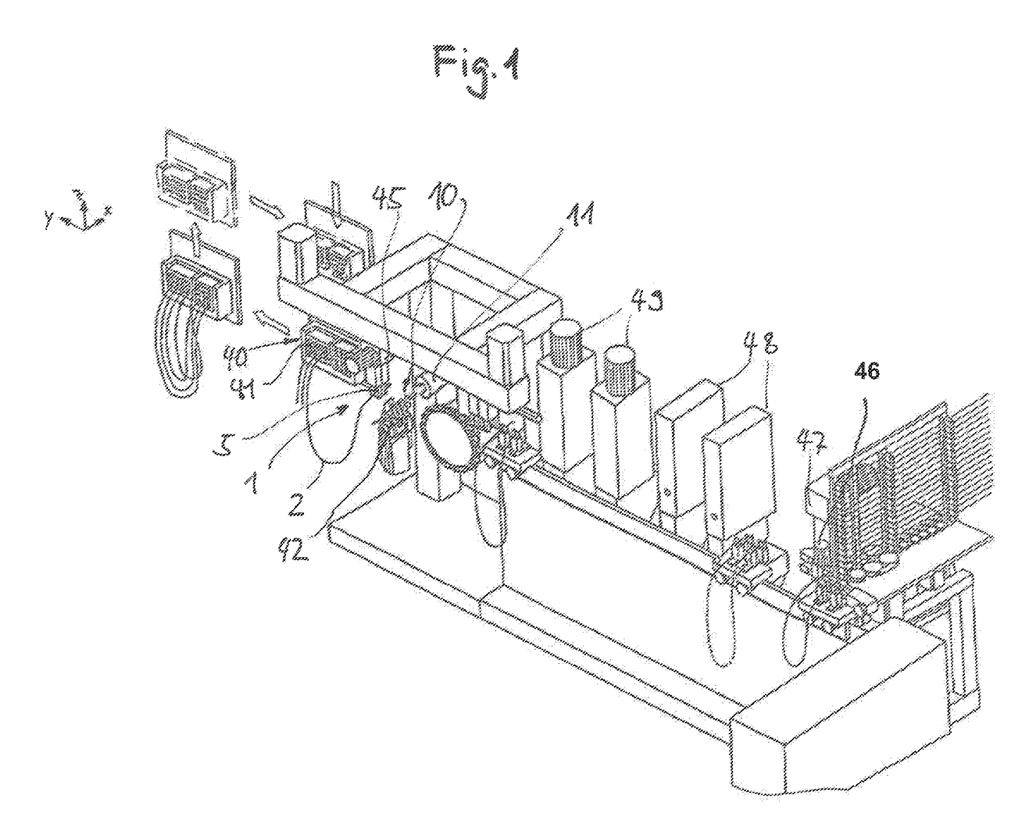
FIG. 1 is a perspective view of a system for producing cables, comprising an equipping arrangement for equipping connector housings with fitted-out cable ends with a cable gripper and an alignment module for the rotationally correct alignment of the fitted-out cable end.

FIG. 1 shows a system for the production of cables 2. The system comprises an equipping arrangement 1 having a cable gripper 5 of an equipping gripping unit and an alignment module 10 for the rotationally correct alignment of the fitted-out cable end. The preparation system shown by way of example also comprises a looper 46 for creating cable loops. The preparation system then comprises stripping stations 47, grommet stations 48 and crimping stations 49. With the exception of the special equipping arrangement 1, the preparation system substantially corresponds to the system shown in EP 1 304 773 A1. The cable gripper 5 is arranged on a carrier 45 that can be displaced in the y-direction. The cable gripper 5 can be moved between the alignment module 10 and the equipping module, denoted by 40, with the connector housings 41 (directions of motion x, y, z). The introduction or insertion direction for inserting the fitted-out cable end into a cell of a connector housing takes place in the x-direction. For subsequent gripping, which process is explained in detail below, the cable gripper 5 is moved back a short distance along the cable, i.e. in the opposite direction relative to the insertion direction (direction of motion x-direction).

The equipping arrangement 1 described in detail below could also be used in other preparation systems. The equipping arrangement 1 can also be provided as an independent system. The integration of the equipping arrangement 1 in a preparation system of the type shown in FIG. 1 is not required. Of course, instead of cable loops, the equipping arrangement 1 can also handle other cable shapes, such as individual straight pieces of cable or cables coming from a cable store.

Figure 2:
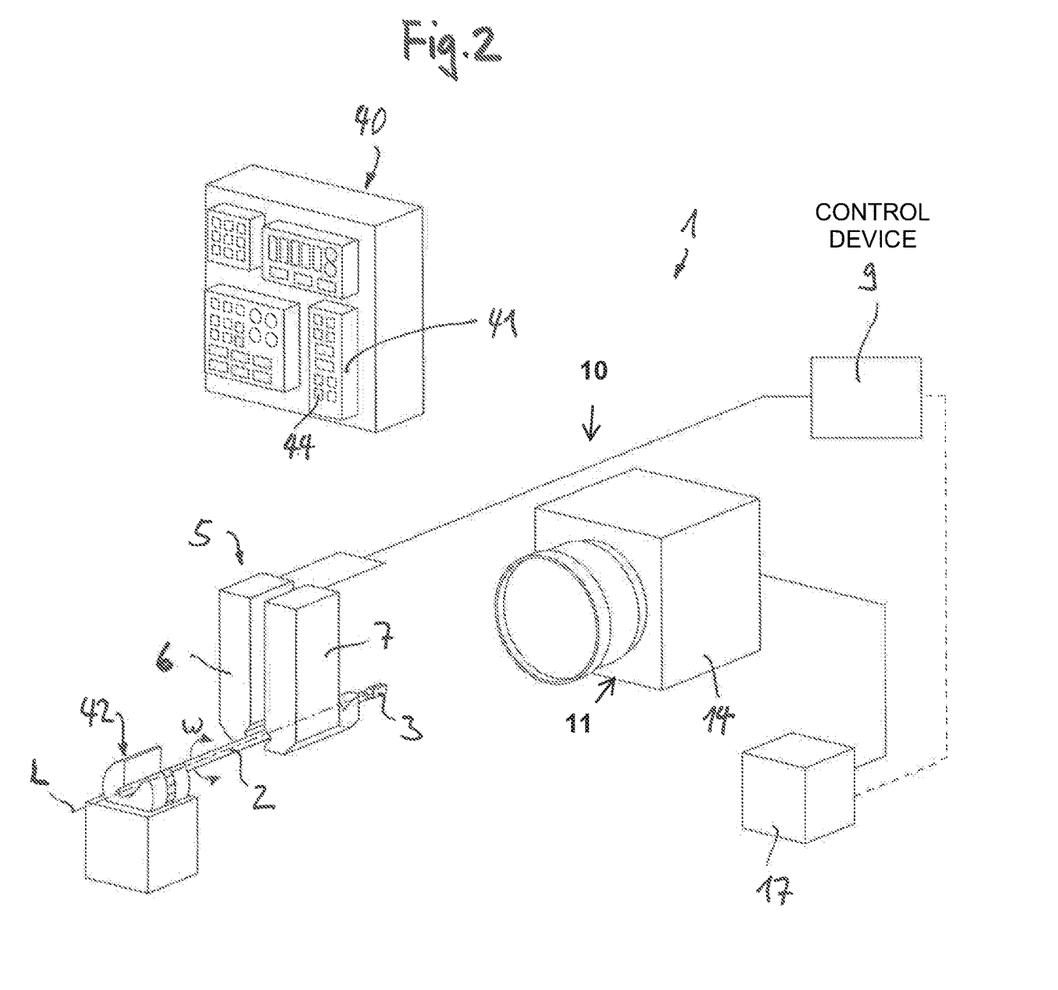
FIG. 2 shows an equipping arrangement for equipping connector housings with fitted-out cable ends with a pneumatically drivable cable gripper of an equipping gripping unit during an alignment process by means of an optical detection device of the alignment module that has a camera.

FIG. 2 shows the equipping arrangement, generally denoted by 1, for equipping connector housings 41 with fitted-out cable ends 3 of cables 2. In FIG. 2, the cable 2 has, for example, a cable end 3 of the cable 2 that is provided with a crimp contact. L denotes a longitudinal axis which is defined by the cable gripper 5 and which corresponds to the longitudinal axis of the cable 2 when the cable 2 is acted upon by the cable gripper 5. In this case of such crimp contacts, it is important that the alignment of the fitted-out cable ends 3 is checked and that the cables are aligned, if necessary, i.e. placed in the correct rotational position. As shown in this case, the crimp contact can have, for example, an outer contour that is rectangular in cross section. A cell of the connector housing 41 that corresponds to this crimp contact is denoted by 44. Of course, the cable end 3 can also be provided with crimp contacts with other shapes or other contact elements. For any necessary alignment, the equipping arrangement 1 has an alignment module 10 for the rotationally correct alignment of the fitted-out cable end 3 with the rotating device 42 for rotating the cable 2 about its longitudinal axis L at least in the region of the cable end, (the rotating motion is indicated by the double arrow w) and an optical detection device 11 for determining the rotational position of the fitted-out cable end 3. The cable or its cable end can optionally be transferred between the processing stations with a transfer device.

Details on the structural design of such a rotary device 42 of the alignment module can be found in the already mentioned EP 1 304 773 A1.

The equipping arrangement 1 further comprises an equipping gripping unit having a cable gripper 5 which has two oppositely movable gripper jaws 6, 7 for grasping and gripping the cable 2. To move the gripper jaws 6, 7, a pneumatic actuator (not shown here) is provided, which can be controlled by a control device denoted by 9.

The present optical detection device 11 comprises a camera 14, preferably a digital camera, positioned in a frontal position in the equipping arrangement, so that the camera 14 is directed in the axial direction onto the frontal end of the cable end 3.

During the actual equipping, i.e. introducing or inserting the fitted-out cable end 3 into a corresponding cell 44 of a connector housing 41 during the production phase, the cable gripper 5 guides the cable end 3 into the correct plug-in position (e.g. in the cell 44). For example, in the case of thin cables 2, it may be necessary, after partially inserting the cable end 3 for the first time, to grip the cable 2 again at a rear position in order to fully insert the cable end 3. The intermediate step required for this is known as subsequent gripping and is common. The equipping arrangement 1 shown here and described in detail below is adapted for such a subsequent gripping.

For subsequent gripping, the gripper jaws 6, 7 must be brought into an intermediate position in which the gripper jaws 6 and 7 no longer hold the cable 2 in a clamping manner—as in the closed position—but grasp it such that the gripper jaws 6 and 7 can move along the cable 2 during the backward motion. The gripper jaws open up to the intermediate position and move back. The cable 2 remains guided by the gripper jaws 6, 7.

Figure 3:
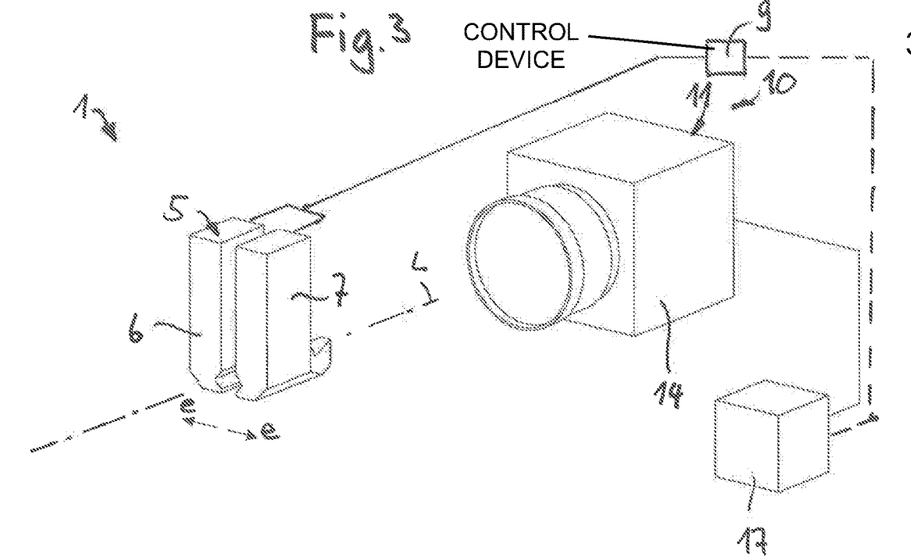
FIG. 3 shows the equipping arrangement from FIG. 2 during a calibration process for calibrating the cable gripper for the intermediate position.

FIG. 3 relates to the same equipping arrangement 1, but in this case during a set-up process for the cable gripper 5 before the production phase, in which the cable gripper is calibrated for the intermediate position. The cable gripper 5 or its actuator is calibrated to set the optimal intermediate position for the subsequent gripping. During the calibration, the actuator is first subjected to a predefined first compressed air pulse, whereupon the gripper jaw is partially opened. The corresponding opening directions of the gripper jaws 6, 7 are shown with arrows e. The intermediate position thus reached is then checked with the camera 14 using an image evaluation unit denoted by 17. If it is identified by the detection device 11 that the desired intermediate position has not been reached, the cable gripper 5 is closed again and the process repeated, with two or more blasts of compressed air now being applied with the same duration of the corresponding compressed air blast. Alternatively, when the process is repeated, only one compressed air blast can be applied again, with the duration of the compressed air blast being changed. In this case, the length of the compressed air pulse is varied.

The optical detection device 11 for determining the rotational position of the fitted-out cable end 3 is designed such that the camera 14 can also be used to monitor the opening motion of the gripper jaws 6, 7 in order to create the intermediate position for subsequent gripping for later equipping of the connector housing. Accordingly, motion and/or position data of the open gripper jaws 6, 7 in the intermediate position can be detected with the optical detection device 11. The control unit 9 is designed and connected to the alignment module 10 having the detection device 11 such that, based on the data of the previously performed opening motion of the gripper jaws 6, 7, which data were determined by the detection device 11, the actuator 8 (see FIG. 10) can be calibrated with regard to the subsequent gripping process. Thus, the control unit 9, the detection device 11 and the image evaluation unit 17 form a gripper location system for calibrating the intermediate position of the cable gripper jaws 6, 7.

The cable gripper 5 is arranged on a carrier 45 (not shown in this case, see FIG. 1). After the end of the calibration process, the cable gripper 5 is fully set up, at least with regard to subsequent gripping. During the production phase, the cable 2 can be guided to the housing receiving device (equipping module 40), in which the connector housing 41 or connector housings is or are received, and the cable end can be inserted into the connector housing. When inserting the cable end 3 into the connector housing 41 by the cable gripper 5, after the cable 2 has been advanced for the first time, during or after which advancing the cable end 3 has not yet been fully inserted into the connector housing, one or more subsequent gripping operations are carried out to gradually advance the cable 2 further, the intermediate position of the gripper jaws 6, 7 being set for the subsequent gripping, which is based on the manipulated variable for the at least one compressed air pulse determined during the calibration. The calibration is performed at a start of production. In the case of longer production runs, for example, it may be necessary to repeat the calibration at predefined intervals.

Figure 4A:
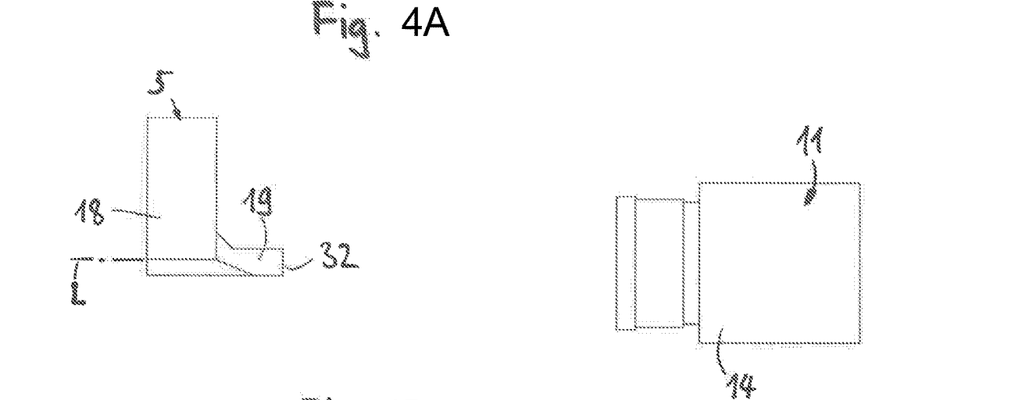
FIG. 4A is a side view of the arrangement from FIG. 3.
Figure 4B:
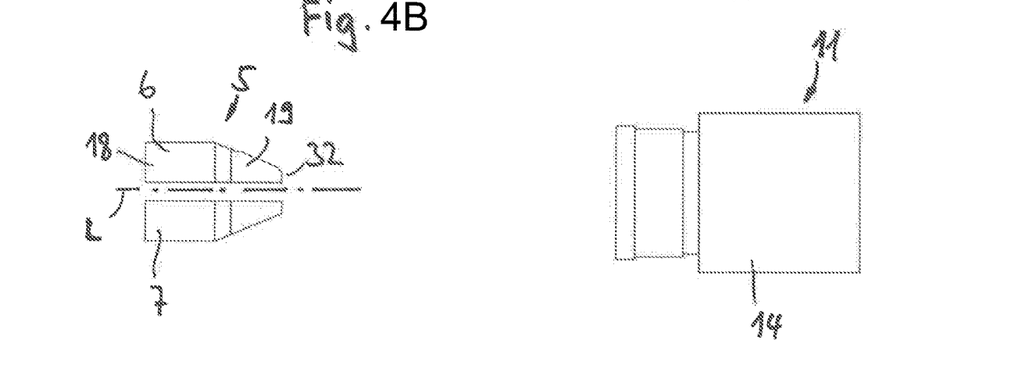
FIG. 4B is a plan view of the arrangement of FIG. 3.

FIGS. 4A and 4B relate to further views of the arrangement according to FIG. 3.

Figure 5:
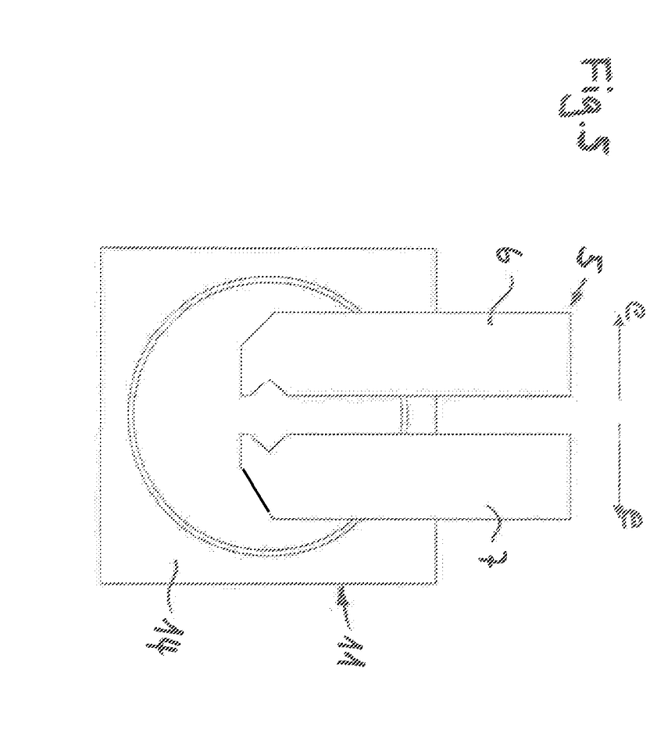
FIG. 5 is a rear view of the arrangement from FIG. 3 (viewing direction along longitudinal axis of the cable or the gripper)

As can be seen from FIGS. 2, 3, 4A and 4B, the cable gripper 5 is configured in two parts, with each of the two parts 6, 7 consisting of a jaw base body 18 having a jaw lug 19 formed thereon and terminating in a front end or tip 32. As can be seen in particular from FIG. 5, the two gripper jaws 6, 7 have groove-like depressions for receiving the cables. Instead of the groove-like depressions shown here, which define a rhombic inner contour in cross section, other shapes are also conceivable. For example, the groove-like depressions could form a semicircle in cross section.

Figure 6:
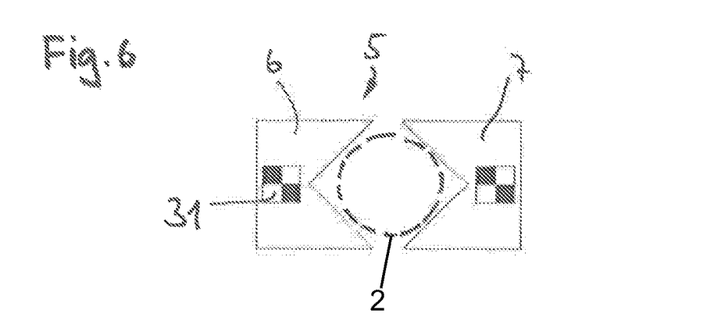
FIG. 6 shows a variant of the cable gripper for the equipping arrangement in a frontal view.

FIG. 6 shows a variant for the cable gripper 5, in which markings 31 are attached to the end faces of the gripper jaws 6, 7, with the help of which markings the image evaluation can be simplified. It can also be seen from this drawing that, in the intermediate position, there is a small air gap between the cable 2 indicated by a dashed line and the gripper jaws 6, 7.

Figure 7:
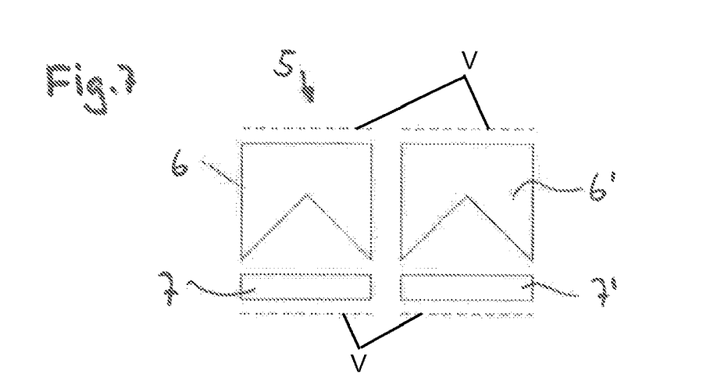
FIG. 7 shows a cable gripper configured as a double gripper for the equipping arrangement.
Figure 8A:
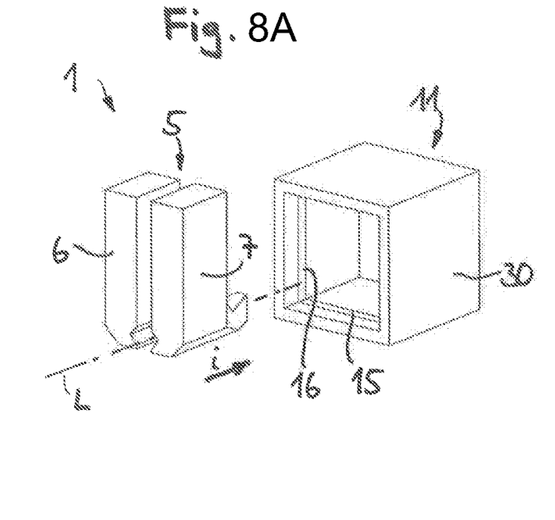
FIG. 8A shows a perspective view of an equipping arrangement for equipping connector housings with fitted-out cable ends with a cable gripper of an equipping gripping unit and an alignment module with an optical detection device having a CCD module, the cable gripper being located outside the effective range of the CCD module.
Figure 8B:
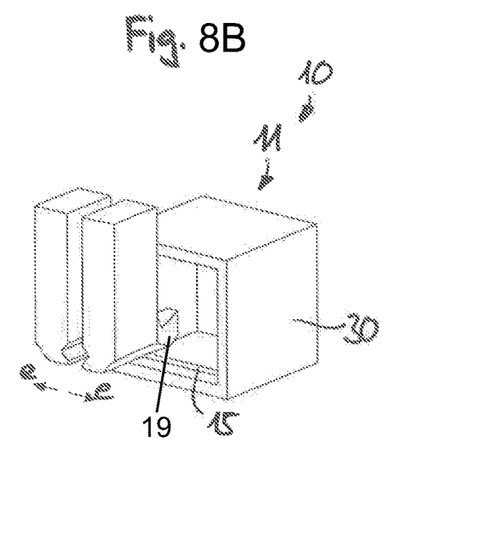
FIG. 8B shows the equipping arrangement from FIG. 8A having a cable gripper advanced into the effective range of the CCD module for the calibration.
Figure 9A:
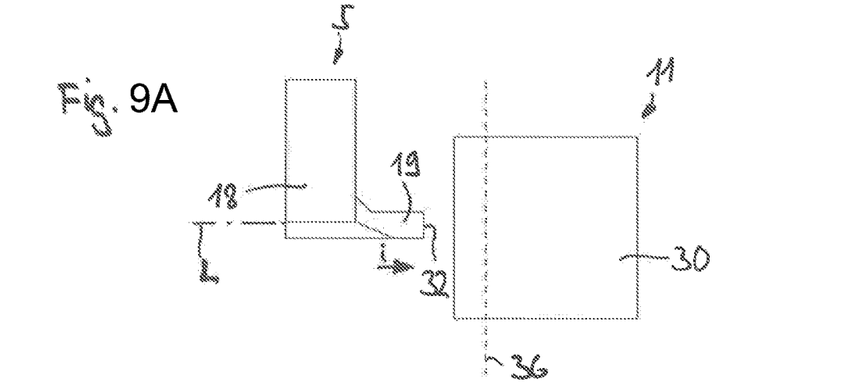
FIG. 9A is a side view of the arrangement according to FIG. 8A.
Figure 9B:
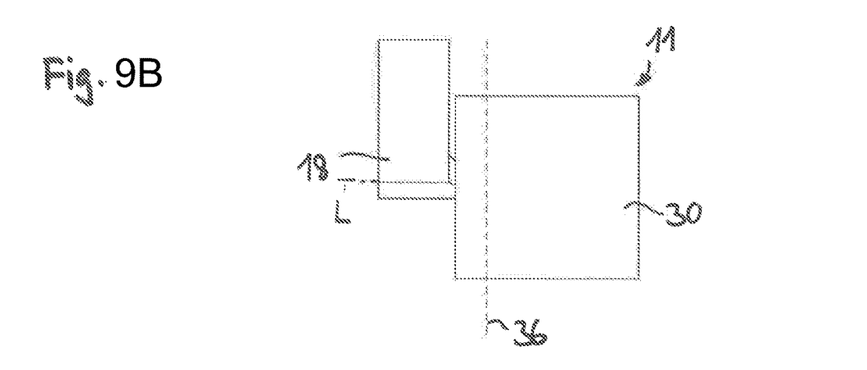
FIG. 9B is a side view of the arrangement according to FIG. 8B.

The equipping arrangement 1 can also have a cable gripper 5 configured as a double gripper. An example of such a cable gripper 5 is shown in FIG. 7. The cable gripper 5 shown here is further characterized by each having differently designed gripper jaws 6, 7; 6', 7'. A virtual caliper for measuring the gripper jaws of an image evaluation program is indicated with dashed lines V. The virtual caliper is attached to the outer contour of the gripper jaws 6, 7; 6', 7', from which the position data of the gripper jaws can be taken. Once the outer contours have been identified, the achieved position of the at least one compressed air pulse can be measured. The data of the opening motion of the gripper jaws 6, 7 can of course also be determined using other known image measurement methods.

The equipping arrangement 1 shown in FIGS. 8A, 8B and 9A, 9B has an optical detection device 11 for determining the rotational position of the fitted-out cable end 3, which device comprises an image acquisition module 30 designated as a CCD module. The CCD module 30 has two CCD line sensors 15, 16 arranged in different directions and lying together on one level and an image evaluation device (not shown here) for evaluating the image data generated by the CCD module and preferably an illumination device (not shown). The line sensor 15 is a line sensor extending horizontally, and the other or second line sensor 16 extends in a vertical direction. For the calibration, the cable gripper 5 is introduced into the CCD module 30 via the jaw lugs 19 (see FIG. 8B and FIG. 9B). Instead of the CCD module 30 shown here, another image acquisition module with at least two line sensors arranged in different directions could also be used. In particular, CMOS line sensors can also be used as line sensors 15, 16. The position of the line sensors 15, 16 being indicated by the dashed line 36 in FIGS. 9A and 9B. Thus, the control unit 9, the image acquisition module 30 and the image evaluation unit 17 form a gripper location system for calibrating the intermediate position of the cable gripper jaws 6, 7.

Figure 10:
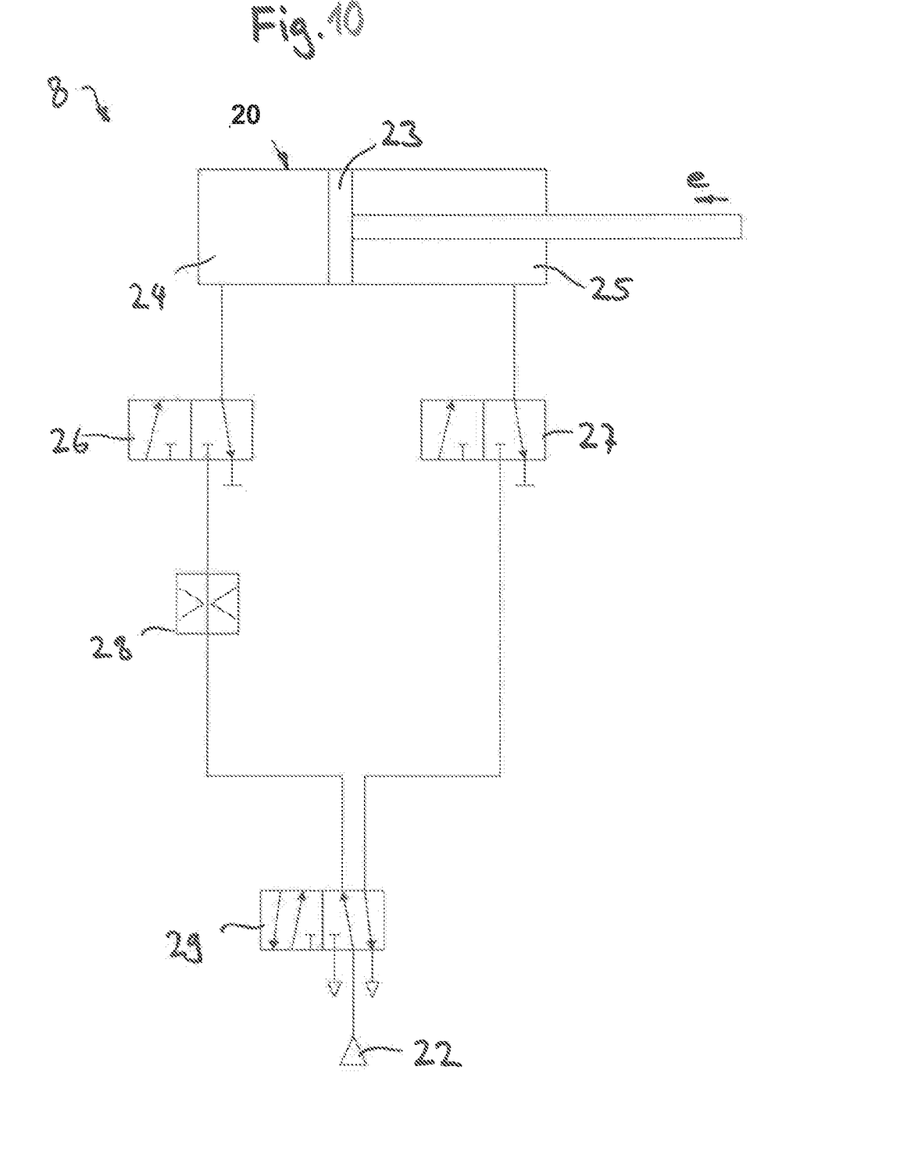
FIG. 10: shows a pneumatic scheme for an actuator for moving the cable gripper of the equipping arrangement.

The pneumatic actuator 8 for actuating or activating the cable gripper 5 of the equipping arrangement 1 has a valve arrangement with at least one control valve which can be actuated by the control unit 9, with which the actuator 8 can be acted upon at least for the opening motion to create the intermediate position with at least one compressed air pulse. A first variant for this actuator relates to FIG. 10. FIG. 10 shows a pneumatic scheme for the actuator. The actuator 8 comprises a pneumatic cylinder 20 configured to be double-acting. The pneumatic cylinder 20 has a piston 23 as an actuating element. The motion of the piston to open the cable gripper is indicated by the arrow e. A compressed air source is denoted by 22. The compressed air can be provided, for example, by a dedicated compressed air source or a compressed air supply line. The valve arrangement of the actuator 8 has two control valves 26, 27 configured as quick-acting valves, with each pressure chamber 24, 25 being assigned a control valve. An orifice valve 28 is connected upstream of the control valve 26 associated with the pressure chamber 24 which decreases during the opening motion. The orifice valve 28 slows down the pressure reduction in the pressure chamber 24, which makes the reaction of the pneumatic cylinder 20 sluggish and simplifies the control via the control unit 9. In addition, the pneumatic system is less sensitive to external forces or influences due to the higher chamber pressure. The valve arrangement also has a 5/2-way valve 29 which follows the compressed air source 22.

FIG. 11 shows a pneumatic scheme for an actuator 8 with two pneumatic cylinders 20 and 21 and a valve arrangement for the simultaneous motion of the gripper jaws. The valve arrangement in relation to each of the pneumatic cylinders 20, 21 corresponds approximately to that of FIG. 10.

Figure 12:
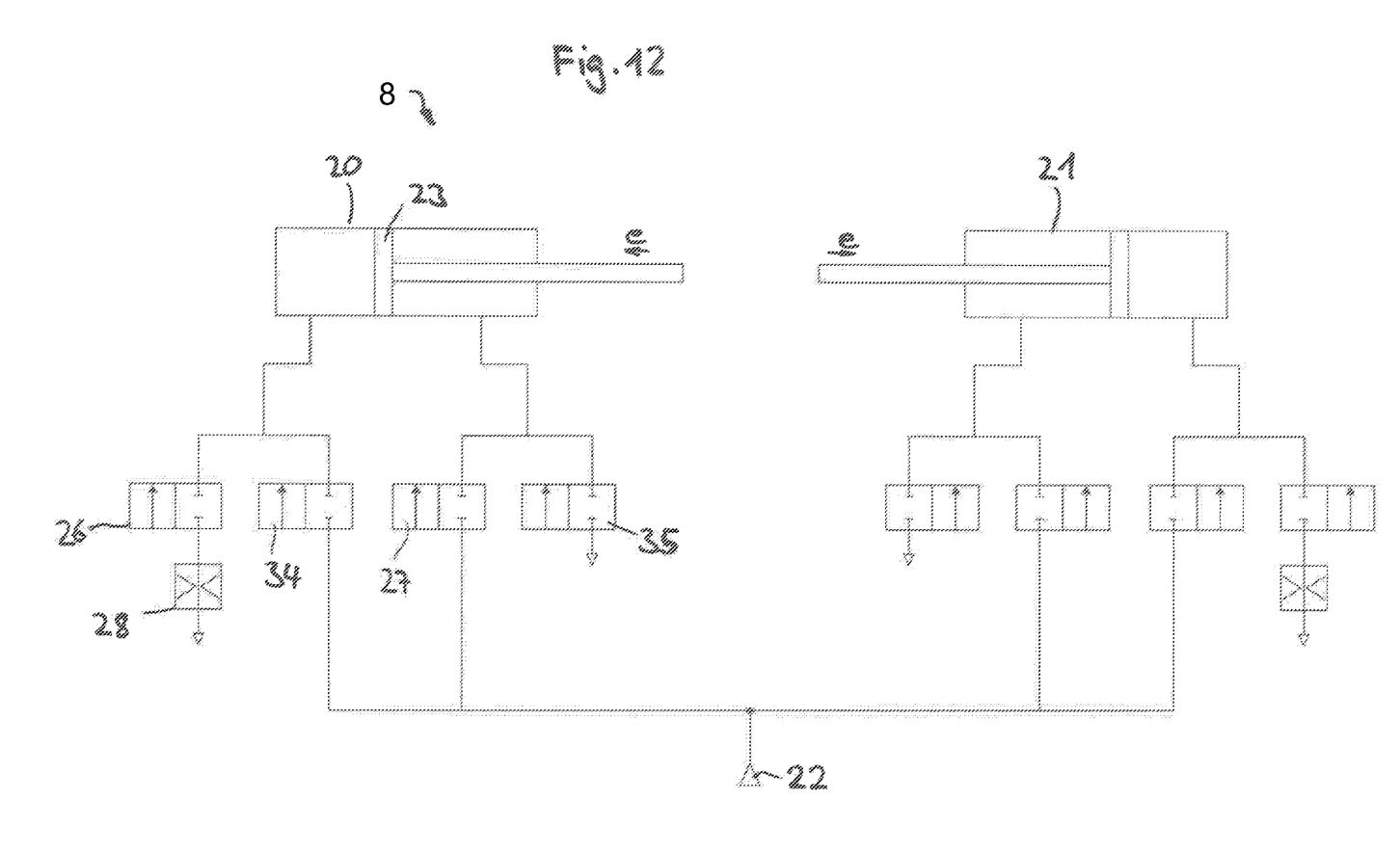
FIG. 12 shows a pneumatic scheme of a further embodiment of an actuator for moving the cable gripper of the equipping arrangement.
Figure 14:
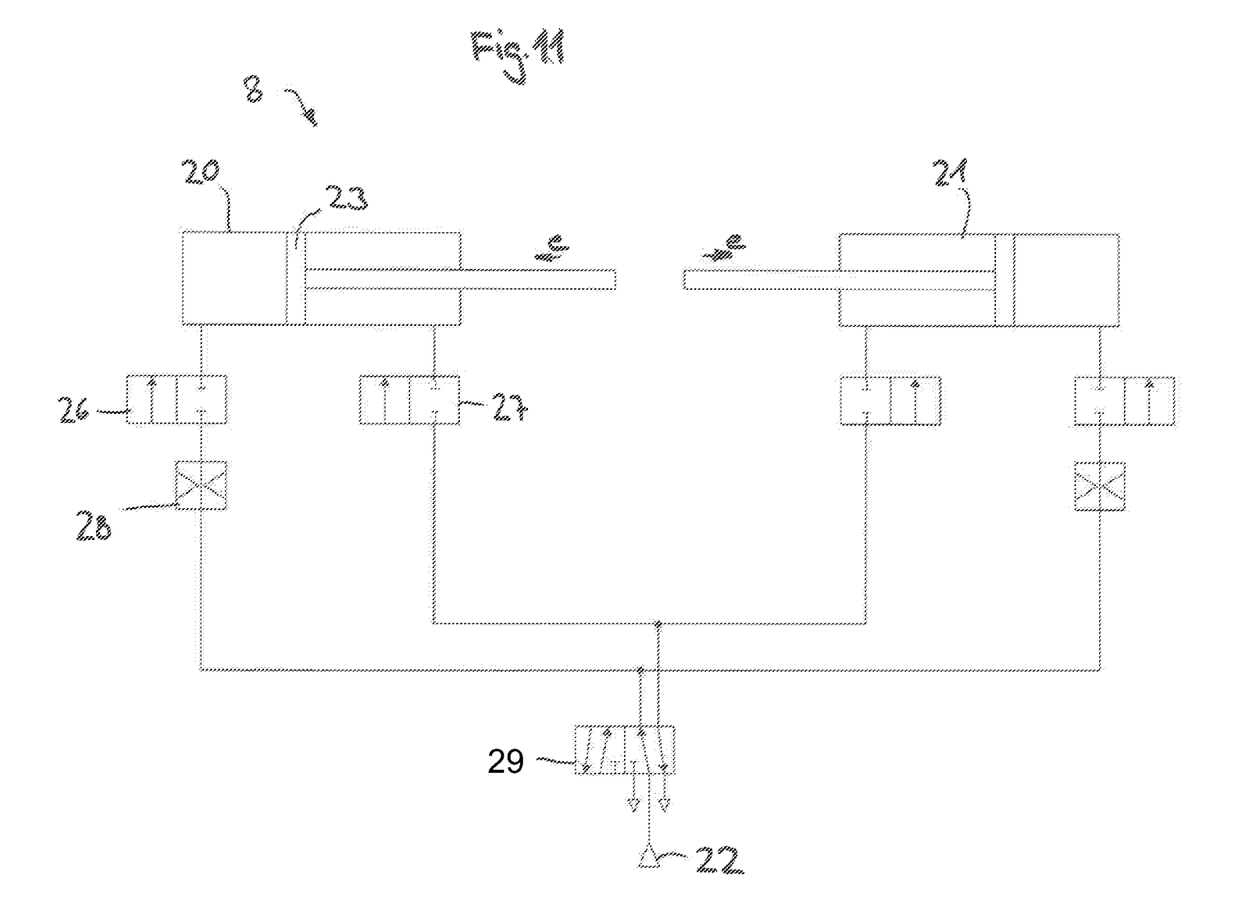

FIG. 12 relates to a variant of an actuator 8 with two pneumatic cylinders 20 and 21. The valve arrangement has a total of eight quick-acting valves, four quick-acting valves per pneumatic cylinder. In contrast to the embodiment shown in FIG. 11, a 5/2-way valve is not required. For the pneumatic cylinder denoted by 20, the four quick-acting valves are the associated valves 26, 34 and the associated valves 27, 35. This variant has the advantage that the cable grippers can be closed quickly. The valve arrangement results in that the end pressure in the closing pneumatic cylinder is reached quickly, which is particularly advantageous for opening the gripper jaws with repeat accuracy. The pneumatic circuit shown in FIG. 12 works with repeat accuracy and quickly, and also with longer pneumatic hoses (at least up to about 1 m in length). This makes it possible to mount the quick-acting valves without moving them, thus keeping the mass of the equipping gripper small. In addition, this variant is characterized by a comparatively low consumption of compressed air.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An equipping arrangement for equipping connector housings with fitted-out cable ends of cables, the equipping arrangement comprising:
    a cable gripper having two gripper jaws for grasping and gripping a cable, the gripper jaws being movable among a closed position, an open position enabling the cable gripper to be removed from the cable, and an intermediate position between the closed position and the open position;
    an actuator operated with a fluid pressure source to actuate the cable gripper for inserting a fitted-out cable end of the cable into a connector housing by the gripper jaws holding the cable in a clamping manner in the closed position of the gripper jaws, the actuator then actuating the cable gripper to transfer the gripper jaws from the closed position to the intermediate position by an opening motion of the gripper jaws enabling the gripper jaws to grasp the cable and be moved along the cable for a subsequent gripping of the cable;
    a gripper location system that determines a position of the gripper jaws, wherein the gripper location system is operatively connected to the cable gripper to calibrate the cable gripper for the intermediate position during a test opening motion of the gripper jaws;
    wherein the gripper location system includes an alignment module for monitoring the opening motion of the gripper jaws, the alignment module using an optical detection device for monitoring the opening motion of the gripper jaws, the detection device positioned looking at a frontal end of the cable gripper; and
    wherein the gripper location system includes a control unit for controlling the actuator, the control unit being connected to the alignment module to calibrate the actuator for the intermediate position based on data of the opening motion of the gripper jaws determined by the detection device.

2. The equipping arrangement according to claim 1 wherein the actuator is mounted on a displaceable carrier and includes a pneumatic cylinder connected to the fluid pressure source for actuating the cable gripper.

3. The equipping arrangement according to claim 1 wherein the actuator includes at least one control valve for applying at least one compressed air pulse from the fluid pressure source to the actuator to actuate the opening motion of the gripper jaws.

4. The equipping arrangement according to claim 1 wherein the actuator includes a pneumatic cylinder having two pressure chambers, a separate control valve configured as a quick-acting valve connected to each of the pressure chambers, and an orifice valve connected one of the control valves associated with a one of the pressure chambers that decreases during the opening motion.

5. The equipping arrangement according to claim 1 wherein the actuator includes a pneumatic cylinder and two control valves configured as quick-acting valves, the pneumatic cylinder having two pressure chambers and each of the control valves is connected to an associated one of the pressure chambers.

6. The equipping arrangement according to claim 1 wherein the detection device includes either a camera or an image acquisition module having two line sensors arranged in different directions.

7. The equipping arrangement according to claim 6 wherein the camera is positioned looking at the frontal end of the cable gripper along a longitudinal axis predetermined by the cable gripper, or wherein the line sensors lie in a plane perpendicular to the longitudinal axis.

8. The equipping arrangement according to claim 7 wherein the gripper jaws each have a jaw lug and the cable gripper is introduced into the image acquisition module via the jaw lugs for monitoring the opening motion.

9. A method for equipping connector housings with fitted-out cable ends of cables, the method comprising the steps of:
    during a production phase, inserting a fitted-out cable end of a cable into a connector housing using a cable gripper with gripper jaws holding the cable;
    after the cable has been advanced for a first time but the cable end has not yet been fully inserted into the connector housing, performing at least one subsequent gripping of the cable for gradually advancing the cable toward the connector housing, wherein the gripper jaws are opened to an intermediate position for the at least one subsequent gripping; and
    during a set-up phase before the production phase, setting up the cable gripper for the at least one subsequent gripping by,
        feeding the cable gripper to an alignment module with an optical detection device positioned looking at a frontal end of the cable gripper and, when required, operating the alignment module to check a rotationally correct alignment of the cable end,
        moving the gripper jaws of the cable gripper using at least one compressed air pulse from a closed position in an opening direction to create the intermediate position as a test, and
        determining a motion of and/or position data of the gripper jaws in the opening direction with the detection device of the alignment module to calibrate the cable gripper for the intermediate position.

10. The method according to claim 9 wherein, during the calibration of the cable gripper, moving the gripper jaws into at least two of the intermediate position by varying a length of the at least one compressed air pulse.

11. The method according to claim 9 wherein, during the calibration of the cable gripper, moving the gripper jaws with several sequences of the compressed air pulse into at least two of the intermediate position, wherein at least one of a length and a number of the compressed air pulses is varied in the sequences.

12. The method according to claim 9 wherein the detection device is a camera and at least one of bringing the gripper jaws into a focal range of the camera and adjusting the camera to focus on the gripper jaws for the calibration of the cable gripper.

13. The method according to claim 9 wherein the detection device is a an image acquisition module with at least two line sensors arranged in different directions and the cable gripper is partially introduced into the image acquisition module during the calibration of the cable gripper.

14. The method according to claim 9 wherein, after the cable gripper is calibrated for a first time at a start of the production phase, repeating the calibration at predefined intervals during the production phase.

15. The equipping arrangement according to claim 1 wherein the alignment module rotationally corrects alignment of the fitted-out cable end using the detection device for determining a rotational position of the fitted-out cable end.

* * * * *